(12) United States Patent  
Long

(10) Patent No.: US 11,780,319 B2  
(45) Date of Patent: Oct. 10, 2023

(54) WORK VEHICLE ELECTRIC DRIVE ASSEMBLY COOLING ARRANGEMENT

(71) Applicant: Deere & Company, Moline, IL (US)

(72) Inventor: Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 802 days.

(21) Appl. No.: 16/842,608

(22) Filed: Apr. 7, 2020

(65) Prior Publication Data

US 2021/0309099 A1 Oct. 7, 2021

(51) Int. Cl.
*B60K 11/02* (2006.01)
*B60K 17/12* (2006.01)
*B60K 25/00* (2006.01)

(52) U.S. Cl.
CPC .............. *B60K 11/02* (2013.01); *B60K 17/12* (2013.01); *B60K 2025/005* (2013.01)

(58) Field of Classification Search
CPC ... B60K 11/02; B60K 17/12; B60K 2025/005
USPC .......................................................... 310/54
See application file for complete search history.

(56) References Cited

U.S. PATENT DOCUMENTS

| | | | |
|---|---|---|---|
| 4,418,777 A | 12/1983 | Stockton | |
| 5,309,778 A | 5/1994 | Antonov | |
| 6,023,134 A | 2/2000 | Carl et al. | |
| 6,078,115 A * | 6/2000 | Uchida | H02K 9/193 |
| | | | 310/58 |
| 8,454,326 B2 | 6/2013 | Grosskopf et al. | |
| 8,541,915 B2 * | 9/2013 | Burns | H02K 7/006 |
| | | | 310/59 |
| 8,776,976 B2 * | 7/2014 | Krafft | H02K 49/043 |
| | | | 310/105 |

(Continued)

FOREIGN PATENT DOCUMENTS

CN 106787452 A 5/2017
DE 10303050 B4 5/2006

(Continued)

OTHER PUBLICATIONS

German Search Report issued in application No. DE102021203379.2 dated Nov. 12, 2021 (05 pages).

(Continued)

*Primary Examiner* — James A Shriver, II
*Assistant Examiner* — Hilary L Johns
(74) *Attorney, Agent, or Firm* — KLINTWORTH & ROZENBLAT IP LLP

(57) ABSTRACT

A drive assembly for a work vehicle includes an electric machine and a transmission assembly, which has a gear set at least in part contained within a transmission housing and has a control orifice communicating with a transmission section of a cooling circuit for the drive assembly being at least in part within the transmission housing. The electric machine has a casing coupled to the transmission housing to be mounted fixedly thereto. The casing has a coolant inlet port and defines an electric machine section of the cooling circuit for the drive assembly that is at least in part within the casing. A controlled flow of coolant is transferred from the electric machine section of the cooling circuit to the transmission section of the cooling circuit via the control orifice.

19 Claims, 12 Drawing Sheets

(56) References Cited

U.S. PATENT DOCUMENTS

| | | | |
|---|---|---|---|
| 9,096,115 | B2 | 8/2015 | Ho et al. |
| 9,402,344 | B1 | 8/2016 | Wenzel et al. |
| 9,698,649 | B2 * | 7/2017 | Cemke .................... H02K 5/26 |
| 9,915,192 | B2 * | 3/2018 | Buschur .................. F02B 39/08 |
| 10,099,552 | B2 | 10/2018 | Long et al. |
| 10,228,027 | B2 * | 3/2019 | Jones ..................... F16D 67/04 |
| 10,252,609 | B2 * | 4/2019 | Falls ...................... H02K 16/00 |
| 10,840,768 | B2 * | 11/2020 | Suzuki .................... H02K 11/25 |
| 2008/0024020 | A1 * | 1/2008 | Lund ....................... H02K 9/19 |
| | | | 310/90 |
| 2008/0230289 | A1 * | 9/2008 | Schoon .................... B60K 1/02 |
| | | | 180/65.6 |
| 2011/0215588 | A1 * | 9/2011 | Gilbert, Jr. ............. H02K 53/00 |
| | | | 74/DIG. 9 |
| 2014/0175916 | A1 * | 6/2014 | Chamberlin ............. H02K 9/19 |
| | | | 310/54 |
| 2014/0364263 | A1 * | 12/2014 | Tokunaga .............. F16C 35/063 |
| | | | 310/90 |
| 2015/0008677 | A1 * | 1/2015 | Brock ..................... F03D 15/10 |
| | | | 290/55 |
| 2016/0129786 | A1 * | 5/2016 | Petersen ................. B60K 17/28 |
| | | | 192/85.01 |
| 2016/0145833 | A1 * | 5/2016 | Abdel-Baqi .......... H02P 25/092 |
| | | | 180/53.4 |
| 2017/0001629 | A1 * | 1/2017 | Vyncke .................. B60K 6/543 |
| 2017/0072778 | A1 * | 3/2017 | Ornella ................... B60K 25/06 |
| 2017/0248196 | A1 * | 8/2017 | Turner .................. F02N 15/022 |
| 2018/0093564 | A1 * | 4/2018 | Long ..................... A01D 69/005 |
| 2018/0100564 | A1 * | 4/2018 | Fliearman ................ F16H 3/54 |
| 2018/0162221 | A1 * | 6/2018 | Long ..................... F16H 61/0059 |
| 2018/0205286 | A1 * | 7/2018 | Barekar .................. F02B 63/00 |
| 2019/0001826 | A1 * | 1/2019 | Suzuki .................... H02K 11/25 |
| 2019/0252939 | A1 * | 8/2019 | Peiffer ................... H02K 5/203 |

FOREIGN PATENT DOCUMENTS

| | | |
|---|---|---|
| DE | 112006000762 T5 | 1/2008 |
| DE | 102007033457 A1 | 2/2008 |
| DE | 102010004596 A1 | 7/2011 |
| DE | 112010005285 T5 | 1/2013 |
| DE | 102010010578 B4 | 3/2014 |
| DE | 102015118535 A1 | 5/2017 |
| JP | 2016166639 A | 9/2016 |

OTHER PUBLICATIONS

Non-Final Office Action issued in Utility U.S. Appl. No. 16/897,464 dated Nov. 30, 2022 (26 pages).

ip.com, Connector Cooling Technique for an Electric Machine, IP.com Prior Art Database Technical Disclosure, Authors et al.: Disclosed Anonymously, IP.com No. IPCOM000258786D, IP.com Electronic Publication Date: Jun. 13, 2019 (3 pages).

Deere & Company, USPTO pending utility U.S. Appl. No. 62/889,258, filed Aug. 20, 2019 which claims the benefit of U.S. Appl. No. 62/889,258, filed Aug. 20, 2019. (29 pages).

Deere & Company, USPTO pending U.S. Appl. No. 62/889,258, filed Aug. 20, 2019. (29 pages).

Deere & Company, USPTO pending U.S. Appl. No. 62/889,540, filed Aug. 20, 2019. (24 pages).

Deere & Company, USPTO pending utility U.S. Appl. No. 16/789,070, filed Feb. 12, 2020. (33 pages).

German Search Report issued in application No. DE102021200039.8 dated Sep. 21, 2021 (05 pages).

Non-Final Office Action issued in Utility U.S. Appl. No. 16/789,070 dated Apr. 26, 2023.

* cited by examiner

WORK VEHICLE ELECTRIC DRIVE ASSEMBLY COOLING ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to electric drives for work vehicles, and in particular to the cooling of various components of such drives.

BACKGROUND OF THE DISCLOSURE

Work vehicles, such as used in the construction, agriculture, forestry, mining and other industries, may have one or more drive assemblies for powering various subsystems of the work vehicle. Such drive assemblies may incorporate hydraulic or electric power components and/or input mechanical power from an engine of the work vehicle, and in turn may output hydraulic, electric and/or mechanical power to various onboard and offboard components. As one example, the drive assembly may have an electric machine and transmission providing mechanical power to a pump drive for powering various hydraulic components of the work vehicle. The drive assembly may operate the electric machine as a motor to output rotational mechanical power that drives one or more pumps. In some cases, the drive assembly may additionally or alternatively operate the electric machine as a generator to output electric power for any number of electric components of the work vehicle, including other electric drives such as may be used to provide tractive power to the work vehicle.

SUMMARY OF THE DISCLOSURE

The disclosure provides a drive assembly for a work vehicle with improved cooling.

In one aspect, the disclosure provides a drive assembly for a work vehicle including a transmission assembly and an electric machine. The transmission assembly has a gear set at least in part contained within a transmission housing and has a control orifice communicating with a transmission section of a cooling circuit for the drive assembly, the transmission section of the cooling circuit being at least in part within the transmission housing. The electric machine has a casing coupled to the transmission housing to be mounted fixedly thereto, the casing having a coolant inlet port and defining an electric machine section of the cooling circuit for the drive assembly that is at least in part within the casing. A controlled flow of coolant is transferred from the electric machine section of the cooling circuit to the transmission section of the cooling circuit via the control orifice.

In another aspect, the disclosure provides a work vehicle having an engine and an engine shaft, including a drive assembly having a drive assembly housing, a transmission assembly, and an electric machine. The drive assembly housing is for mounting the drive assembly and retaining a volume of coolant within the drive assembly, the drive assembly housing includes a transmission housing and a casing coupled to the transmission housing to be mounted fixedly thereto. The transmission assembly has a gear set at least in part contained within the transmission housing and has a control orifice communicating with a transmission section of a cooling circuit for the drive assembly, the transmission section of the cooling circuit being at least in part within the transmission housing. The electric machine at least in part is contained within the casing, the casing having a coolant inlet port and defining an electric machine section of the cooling circuit for the drive assembly that is at least in part within the casing. A controlled flow of coolant is transferred from the electric machine section of the cooling circuit to the transmission section of the cooling circuit via the control orifice.

The details of one or more embodiments are set forth in the accompanying drawings and the description below. Other features and advantages will become apparent from the description, the drawings and the claims.

BRIEF DESCRIPTION OF THE DRAWINGS

Like reference symbols in the various drawings indicate like elements.

DETAILED DESCRIPTION

Figure 1:
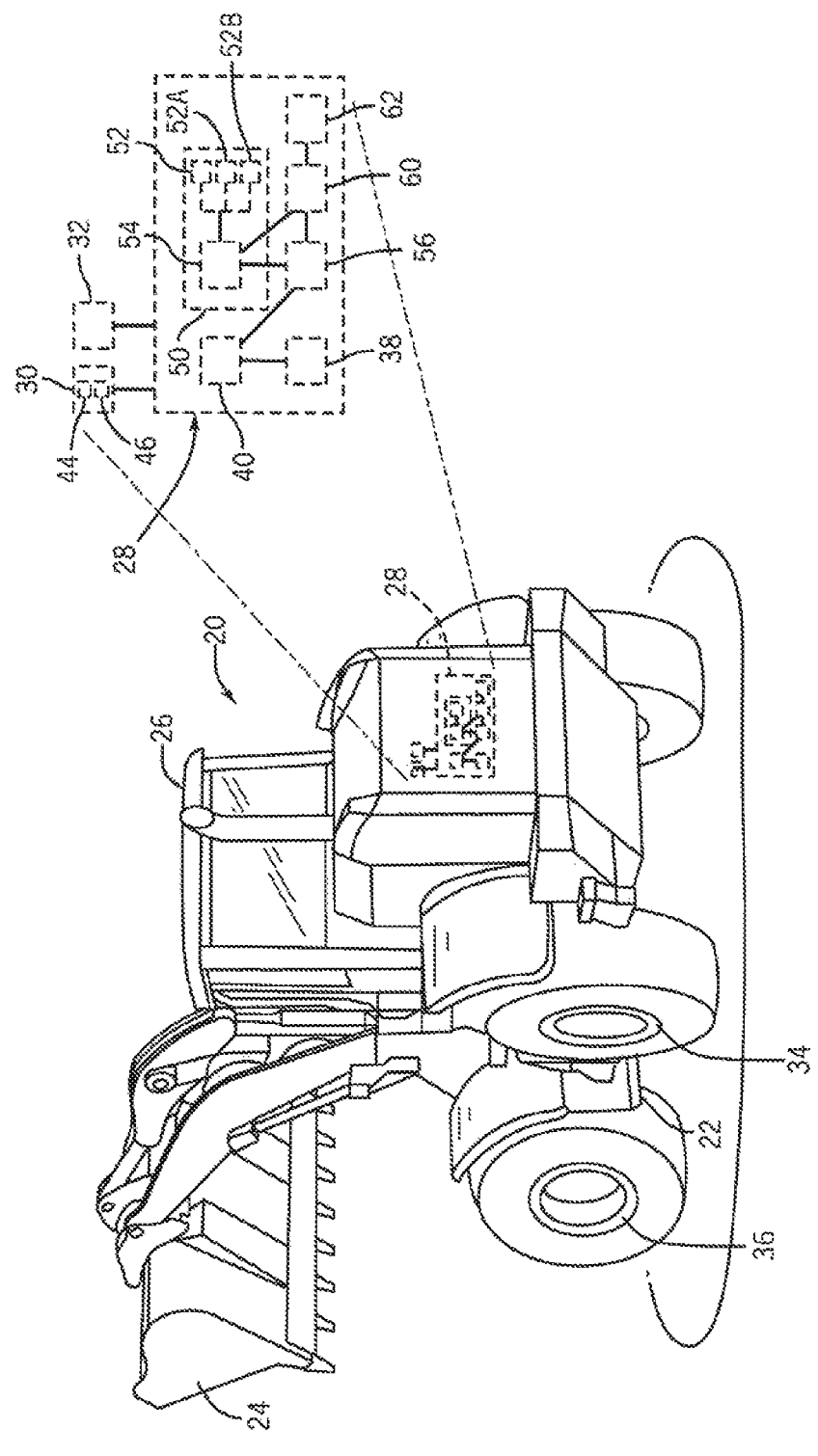
FIG. 1 is a simplified perspective view of an example work vehicle in the form of a wheel loader in which a drive assembly may be used in accordance with this disclosure.

The following describes one or more example embodiments of the disclosed work vehicle electric drive assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral" and "transverse" may be used. Such terms are defined, at least in part, with respect to an electric machine, a passage or circuit for fluid flow, a rotor, a rotating shaft and/or a stator. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached.

Overview

Work vehicles, such as construction vehicles, may utilize electric drive assemblies that include electric machines paired with transmissions in a variety of applications onboard the work vehicle and/or in conjunction with attached work implements. For example, such drive assemblies may provide tractive power to the wheels, supplement engine power sent to the wheels, transfer mechanical power to onboard components through a pump drive, and/or be used as a generator for converting mechanical energy (e.g., from the engine) to electrical energy. These various drive assembly functions may generate significant heat during operation. To achieve the required cooling, an electric machine and transmission assembly may each be designed to dissipate heat via conduction (e.g., a housing of the electric machine in contact with stator coils), convection (e.g., air passing through gaps in components, coolant being directed along components), or combinations thereof. The electric machine may be one of various electric motors (e.g., alternating current (AC) motors and direct current (DC) motors), generators and the like, and the transmission assembly provides one or more gear sets configured to deliver a desired speed and torque from a rotational output of the electric machine.

Generally, this disclosure provides a drive assembly for use in a work vehicle that has a single combined cooling circuit for cooling multiple discrete functional components. The discrete components are cooled in series from a source tank of coolant (e.g., pressurized oil or the like) that is fed to a single input port. Such coolant directly or indirectly absorbs heat from various sub-components (e.g., stator or rotor of an electric machine, individual gears of a transmission, etc.) and flows away from the sub-components to carry away heat. The coolant subsequently returns to the source tank for reuse in the cooling circuit after passive or active cooling of the coolant.

In certain embodiments, the drive assembly includes an electric machine and a transmission assembly that are each provided in separate housings. The electric machine housing and the transmission housing are directly and rigidly mounted together at mating interface. Each housing also defines coolant passages of the cooling circuit that, when assembled together, are aligned and in fluid communication. As such, a flow of coolant in one component housing passes through a threshold at the interface and into the second component. This transfer occurs without hoses or other external structures. Additionally, the drive assembly may include one or more additional functional components (e.g., an additional transmission and/or generator) that are also separately housed. These additional functional components are fluidically coupled to the cooling circuit downstream of the electric machine and transmission and may be mounted together directly at one or more other mating interfaces or coupled using external hoses, fittings, and the like.

In one aspect, the cooling circuit has an electric machine section and a transmission section. The electric machine section of the cooling circuit is routed within the electric machine housing and likewise the transmission section is routed within the transmission housing. The two sections of the cooling circuit intersect at the interface between the electric machine housing and the transmission housing, and a control orifice is provided near the interface (e.g., in the transmission housing just beyond the interface) to meter a flow of coolant from the electric machine section to the transmission section.

In another aspect, the control orifice controls the volume and rate of coolant flow across the threshold between discrete components (e.g., from the electric machine section to the transmission section of the cooling circuit). The control orifice balances the coolant flow to provide sufficient flow to downstream component(s), such as the transmission assembly, without depriving upstream component(s), such as the electric machine, of their requisite coolant flow. To this end, the control orifice has a metering port sized for the desired coolant flow in the component(s) through which the cooling circuit flows. The control orifice can be formed as a unitary part within a coolant passage proximate the interface (e.g., machined in a coolant passage formed in a component of the transmission housing). Alternatively, the control orifice may be a separate removable and interchangeable part that is selectively mounted (e.g., press-fit or threaded) into a coolant passage proximate the interface. The control orifice may be located on either side of the interface, that is, for example, within the electric machine housing or the transmission housing.

In addition to the controlled coolant flow from one discrete component to another, in certain embodiments, the disclosed drive assembly may provide combined cooling for sub-components within one of the discrete components. In one example, the electric machine is a permanent magnet electric motor with a casing containing a drive assembly including a stator and rotor that are separately cooled by a stator feed circuit and a rotor feed circuit. An inlet orifice is positioned near an input port of the cooling circuit to meter a flow of coolant into the stator feed circuit, similarly to the control orifice of the transmission assembly. The casing defines coolant passages that divide and direct coolant flow toward the stator and rotor feed circuits. The rotor feed circuit extends from the casing radially inward to the rotor and then subsequent through axial and radial passages formed in the rotor to conductively cool a rotor shaft, permanent magnet, and other components. The stator feed circuit has one or more serpentine passages defined in an inner periphery of the casing to pass coolant along an outer periphery of windings of the stator. The stator feed circuit may be in communication with a spray ring that sprays coolant onto end turns of windings of the stator.

Further, in certain embodiments, the disclosed drive assembly provides a transmission assembly providing gear reduction to and from the electric machine. The transmission assembly may be an epicyclic gear set with a fixed ratio or multiple gear ratios (e.g., multiple ratios effected by a clutch mechanism). A component of the transmission assembly provides the control orifice for the coolant supply into the transmission. The component may be a gear set component and may be fixed and form part of the external housing of the transmission that is fixedly mounted to the electric machine. The component may be a carrier for one or more planetary gears of the epicyclic gear set. The carrier also may include coolant passages for delivering coolant from the control orifice to the epicyclic gear set.

In yet another aspect, the drive assembly may effect multiple power flow paths in multiple directions. In a drive mode, electrical power in the electric machine is converted to mechanical rotation of a rotor, flows through the transmission, and is output as mechanical power. The mechanical power may be transferred to various other systems, such as providing tractive power to wheels, to power hydraulic pumps in a pump drive, or the like. In a generator mode, mechanical rotation from an external source (e.g., a gear set of the pump drive connected to an engine shaft of an engine) drives the gear set in the transmission in an opposite rotational direction as in the drive mode, which imparts a reverse rotation to a rotor of the electric machine to induce an electric current, converting the mechanical input to electric power in the electric machine. The electric machine is coupled via wiring to a motor (e.g., of a final drive), battery or other electrical system to deliver the convert electric power thereto. For either operating mode, the cooling circuit flows in the same manner and the same direction through the coolant input port to effectively cool both the electric machine and the transmission.

The disclosure further provides the drive assembly incorporated with a hydraulic pump drive for operatively connecting the drive assembly with hydraulic components of the work vehicle. The pump drive may include gear sets housed within a pump housing or manifold. In the drive mode of the drive assembly, the pump drive transfers the mechanical power (torque) output from the drive assembly to activate one or more hydraulic pumps, which drive various hydraulic components of the work vehicle, such as wheel propulsion, wheel steering or work implement manipulation. The pump drive may also provide a mechanical connection to the drive assembly from other parts of a work vehicle, such as a shaft of an engine.

The following describes one or more example implementations of the disclosed drive assembly. Discussion herein may sometimes focus on the example application of a cooling circuit for a drive assembly of a wheel loader, but the disclosed drive assembly is applicable to other types of mated components and work vehicles, including various other construction machines (e.g., crawlers, motor graders, dump trucks) as well as various agriculture or forestry machines (e.g., combines, harvesters, balers, mowers, forwarders, forestry skidders and so on) and utility vehicles. Also, while the following describes the drive assembly for mounting with a pump drive, aspects of the disclosure are applicable to other applications, especially powered wheel drives.

Example Embodiments of Drive Assembly

Referring to FIG. 1, in some embodiments, the disclosed work vehicle 20 may be a wheel loader although, as noted, the drive assembly described herein may be applicable to a variety of machines, such as agricultural vehicles, forestry vehicles (e.g., forwarders) and other construction vehicles (e.g., crawler excavators). As shown, the work vehicle 20 may be considered to include a structural main frame or chassis 22 supporting a work implement 24 that is selectively positioned by various combinations of structural elements (e.g., arms, crossbars, pivot joints, etc.) and controllably moved utilizing any number of actuators, such as hydraulic cylinders. The work vehicle 20 may further be considered to include an operator cabin 26, power train 28, a control system 30, and a hydraulic system 32. The work vehicle 20 may be supported off the ground by ground-engaging wheels or tracks. In the illustrated example, the work vehicle 20 includes a front axle (not shown) mounting steerable wheels 34 (one at each left/right lateral side of the work vehicle 20) and a rear axle (not shown in FIG. 1) mounting wheels 36 (one or more at each left/right side of the work vehicle 20).

Generally, the power train 28 has wheel steering components 38, including various devices (e.g., power steering pumps and lines, steering mechanisms, and the like) that couple manual (e.g., operator steering controls or wheel) and/or automated (via the control system 30) steering input to the wheels, such as the steerable wheels 34. The power train 28 includes a source of propulsion, such as an engine 40, which supplies power to the work vehicle 20, as either direct mechanical power or after being converted to electric or hydraulic power. In one example, the engine 40 is an internal combustion engine, such as a diesel engine, having an engine shaft 42 for outputting mechanical power. The engine 40 is controlled by an engine control module (not shown) of the control system 30. It should be noted that the use of an internal combustion engine is merely an example, as the source of propulsion may be a fuel cell, an electric motor, a hybrid-gas electric motor, or other power-producing devices.

In addition to providing tractive power to propel the work vehicle 20, the engine 40 may provide power to onboard subsystems including various electrical and hydraulic components of the work vehicle, and for off-boarding power to other sub-systems remote from the work vehicle 20. For example, the engine 40 may provide mechanical power that is converted to an electric format to run the electronics of the control system 30 and one or more electric drives of the work vehicle 20. The control system 30 thus may have mechanical to electrical power conversion components 44, one or more batteries 46, and associated electronics, including various alternators, generators, voltage regulators, rectifiers, inverters, and the like.

The engine 40 may also provide mechanical power that is converted to hydraulic format to power various pumps and compressors that pressurize fluid to drive various actuators of the hydraulic system 32 in order to power components of the work vehicle 20 such as the work implement 24, wheel steering and braking, a tow-behind work implement (not shown), or the like. In this example, the work vehicle 20 supports the mounting of the work implement 24 as a front loader that may be raised and lowered during operation by one or more hydraulic piston-cylinder devices. The hydraulic system 32 may be coupled to and operated by the control system 30 in response to commands from an operator input device (e.g., operator controls, operator display device, etc.)

in the cabin 26 or remote from the work vehicle 20. The hydraulic system 32 may include other components (e.g., valves, flow lines, pistons/cylinders, seals/gaskets, and so on), such that control of various devices may be effected with, and based upon, hydraulic, mechanical, or other signals and movements.

The control system 30 may be configured as a computing device with associated processor devices and memory architectures, as a hard-wired computing circuit (or circuits), as a programmable circuit, as a hydraulic, electrical, or electro-hydraulic controller. The control system 30 may be configured to execute various computational and control functionality with respect to the work vehicle 20, including various devices associated with the power train 28, the hydraulic system 32, and various additional components of the work vehicle 20. In some embodiments, the control system 30 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 30 is configured to operate various aspects of the disclosed electric machine, which may form part of the power train 28 or part of another subsystem of the work vehicle 20.

Figure 2:
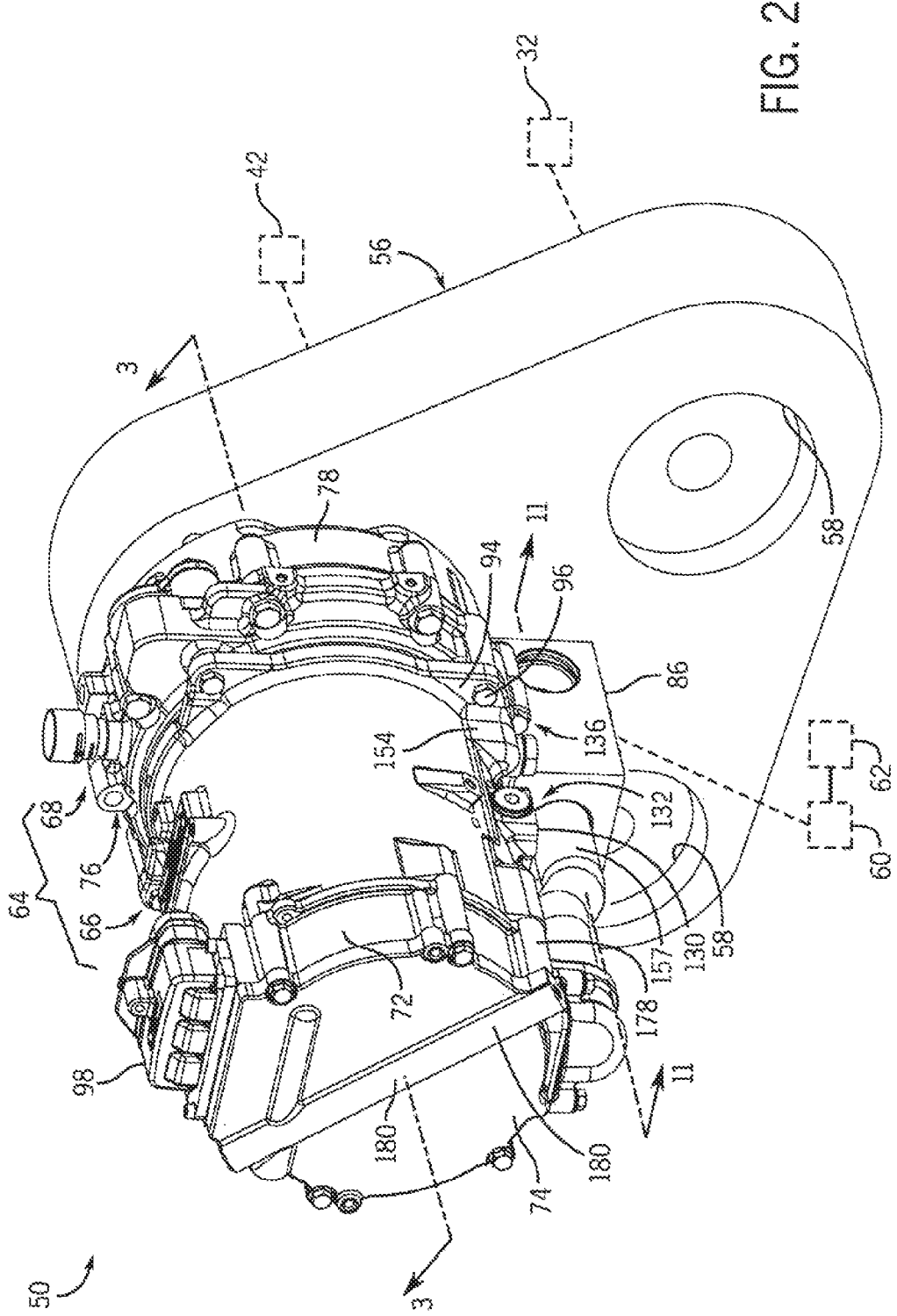
FIG. 2 is an isometric view of an example drive assembly with a pump drive (shown simplified) for the example work vehicle of FIG. 1.

Referring also to FIG. 2, an example drive assembly 50 of the power train 28 is shown including an electric machine 52 and a transmission assembly 54 operatively paired together. The drive assembly 50 may be implemented for transferring power to the wheels 34 of the work vehicle 20. The drive assembly 50 may additionally or alternatively provide conversion to electric and/or hydraulic power to various components of the work vehicle 20 as noted above, for example by implementing the electric machine 52 in a generator mode providing electric power throughout the vehicle. In such a generator mode, the drive assembly 50 may provide power to one or more of the control system 30, the hydraulic system 32, a powered wheel axle for providing tractive power to the wheels (not shown), or the like. In the illustrated example, the drive assembly 50 is mounted to a pump drive 56 to couple the power train 28 with the hydraulic various pumps (not shown) of the work vehicle 20 via insert mounts 58. For example, the pump drive 56 includes gearing such as helical spur gear sets (not shown) to transfer rotational output from the drive assembly 50 to drive the hydraulic pumps mounted in the insert mounts 58.

As shown schematically in FIG. 1, the pump drive 56 may be coupled to a secondary transmission 60 and a secondary electric machine 62 (e.g., the secondary electric machine 62 serving as a dedicated generator as a motor-generator pair with the electric machine 52). In such an arrangement, the secondary transmission 60 may also share the volume and flow of coolant from the combined cooling circuit disclosed herein would provide two components (electric machine 52 and transmission assembly 54) directly connected in series as well as the secondary transmission 60 and/or the secondary electric machine 62, such that the cooling system would combine to cooling third and fourth components. In some cases, such additional components would be coupled together directly (i.e., by direct mounting and interfacing of housings) or by external hoses and fittings.

in the illustrated example, the drive assembly 50 includes a drive assembly housing 64 that connects the components of the drive assembly 50 together and fixedly mounts the drive assembly 50 to the pump drive 56. The drive assembly housing 64 is defined by exterior components of the electric machine 52 and the transmission assembly 54 fastened together, for example by bolts. In particular, the drive assembly housing 64 comprises an electric machine housing 66 and a transmission housing 68 that may each be formed of one or more rigid cast metal parts. The example electric machine housing 66 includes a casing 70, an end section 72 and a cap 74 rigidly assembled together to encase the electric machine 52. The transmission housing 68 includes a carrier 76 and a gearbox 78 rigidly assembled together to encase the transmission assembly 54. With this arrangement, the drive assembly housing 64 provides a contiguous, generally cylindrical encasement that retains a volume of coolant fluid (e.g., oil) within the drive assembly 50.

Figure 3:
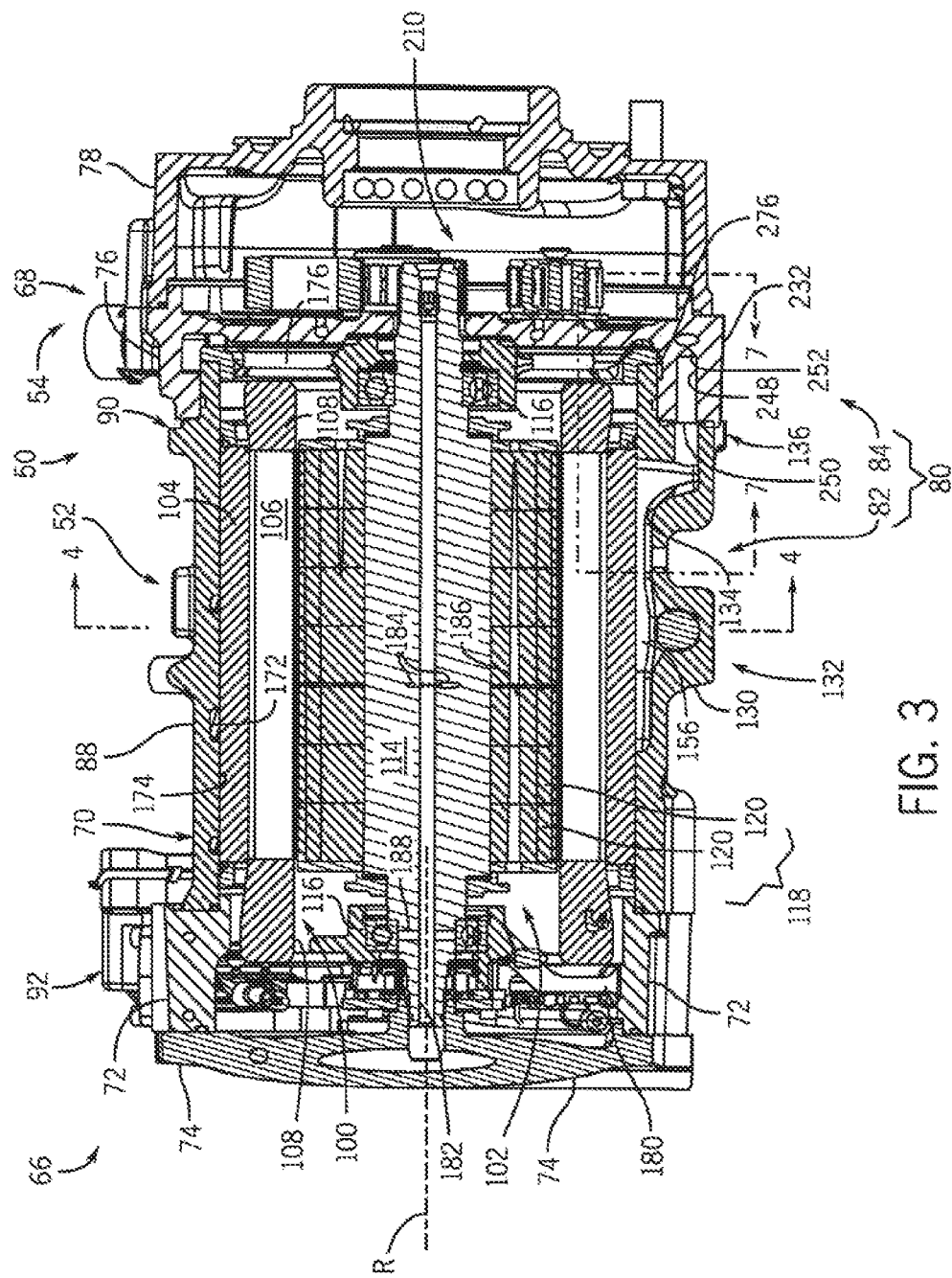
FIG. 3 is a cross-sectional view of an example electric machine and transmission assembly of the example drive assembly taken at plane 3-3 of FIG. 2.

Referring also to FIG. 3, the drive assembly housing 64 encases a cooling circuit 80 of various passages that deliver coolant to both the electric machine 52 and the transmission assembly 54 from a single coolant source input. The cooling circuit 80 is therefore a combined cooling circuit for two discrete components (i.e., electric machine 52 and transmission assembly 54) and provides the only controlled cooling for these components. The cooling circuit 80 does not require any external hoses or lines to deliver coolant between the electric machine 52 and the transmission assembly 54. Instead, the flow is contained within the drive assembly housing 64 and, in part, flows through passages formed in the drive assembly housing 64. In particular, the coolant flows from an electric machine section 82 of the cooling circuit 80 to a transmission section 84 of the cooling circuit 80 in series by flowing through mating coolant passages in the casing 70 and the carrier 76. In other words, coolant flows directly and internally through an interface where the electric machine 52 is fixedly mounted with the transmission assembly 54. In the illustrated example, an outlet block 86 is mounted below the drive assembly 50 to transfer used coolant from both the electric machine 52 and the transmission assembly 54, which subsequently may be recirculated (via various lines and fittings) to a hydraulic reservoir or tank 87, as shown schematically in FIG. 4).

Figure 4:
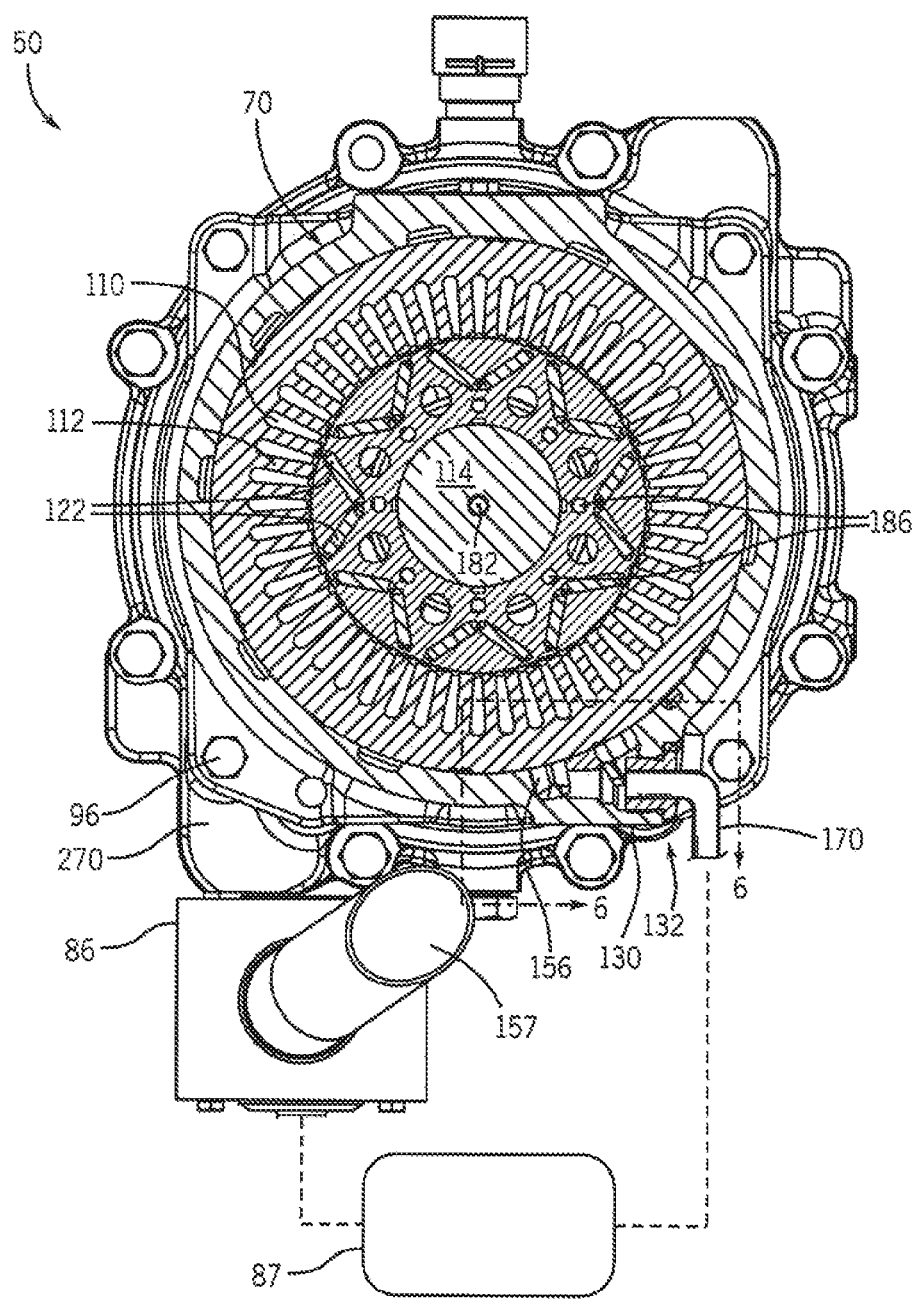
FIG. 4 is a cross-sectional view of thereof taken at plane 4-4 of FIG. 3.
Figure 5:
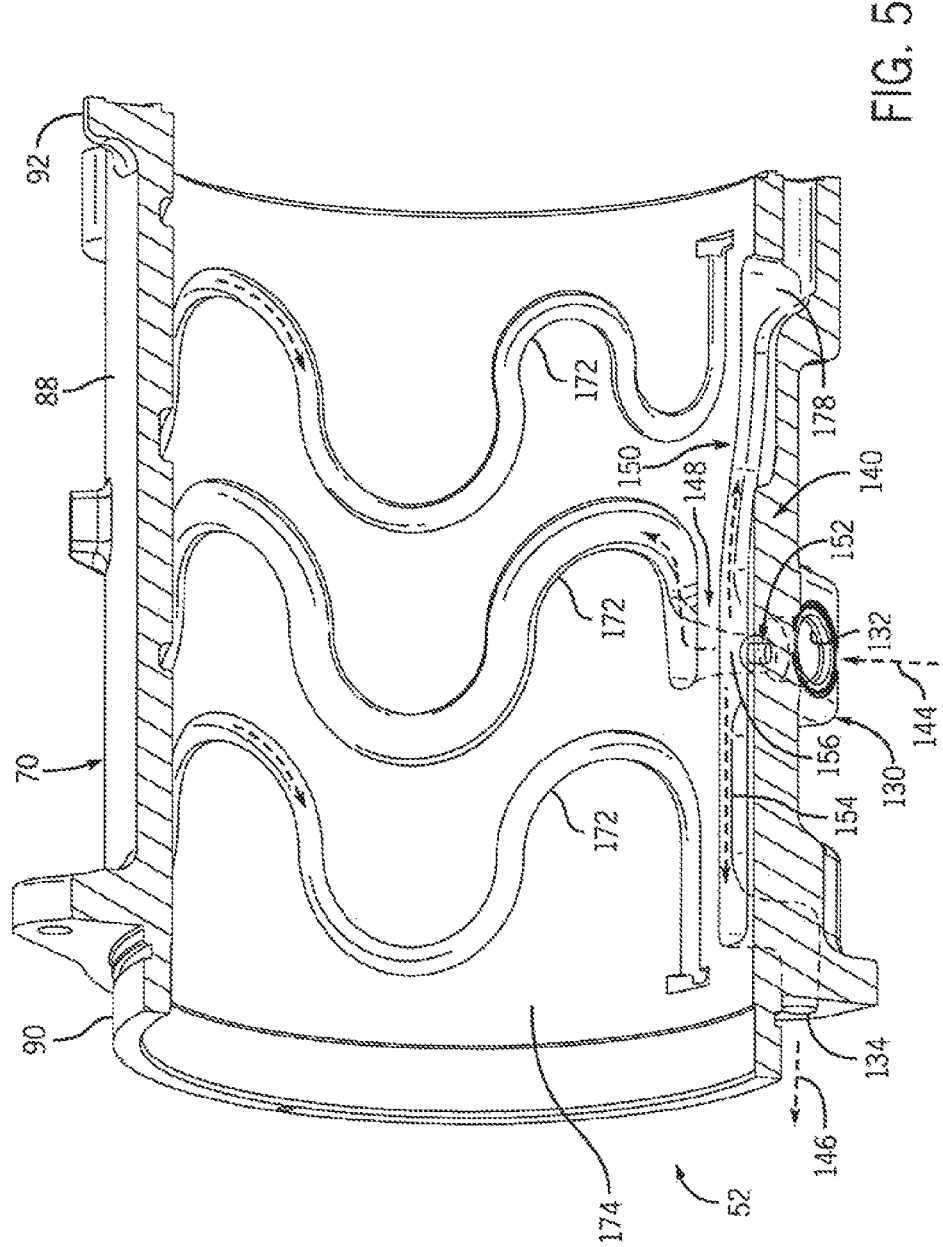
FIG. 5 is a cross-sectional view of an example casing of the example electric machine of FIG. 3.

Referring also to FIGS. 3 and 4, the casing 70 of the example electric machine 52 has a generally hollow annular (e.g., cylindrical) shape with an exterior peripheral surface 88 extending about an axial reference axis R (e.g., a drive axis) from a first axial end (e.g., a drive end 90) to a second axial end (e.g., a non-drive end 92). The drive end 90 may include one or more mounting flanges 94 with a plurality of mounting bores for attachment (e.g., via bolts 96) to the carrier 76 of the transmission assembly 54 or another nearby fixed component. One or more connectors 98 are arranged on the casing 70 for various purposes, such as supplying power from the power train 28 or batteries 46 of the work vehicle 20 and providing wired electrical connection with the control system 30. The end section 72 of the electric machine housing 66 is also a hollow annular shape located at the non-drive end 92, and the cap 74 closes the non-drive end 92.

The electric machine 52 of the illustrated example is a permanent magnet motor including a stator 100 and a rotor 102. The stator 100 includes a core 104 arranged in an annular shape coaxial with the rotor 102 and may be formed from a solid core material, a plurality of stacked laminations, or a split core material. The stator 100 further includes wire coils 106 positioned (e.g., wrapped about) radially inner portions of the core 104. The wire coils 106 may include axial end turns 108 that extend axially beyond the core 104. As shown in FIG. 4, a plurality of slots 110 and a plurality of protrusions 112 are arranged at a radially inner portion of the core 104. The plurality of slots 110 may be symmetrical and evenly circumferentially spaced about the reference axis R. When assembled, the wire coils 106 of the stator 100 are mounted in the plurality of slots 110 and wrapped around one or more of the plurality of protrusions 112.

The rotor 102 has a rotor shaft 114 configured for rotation about the reference axis R. The rotor shaft 114 may be supported for rotation relative to the casing 70 by one or more bearings, for example roller bearing assemblies 116 mounted proximate each of the drive end 90 and the non-drive end 92. The rotor shaft 114 may be unitarily formed as a single integral part extending axially beyond the casing 70 to couple with the transmission assembly 54, or may be a subassembly with two or more parts. The rotor 102 also includes a rotor core 118 mounted for co-rotation with the rotor shaft 114. The rotor core 118 is formed from a plurality of rotor laminations 120. As shown in FIG. 4, each of the plurality of rotor laminations 120 carries a plurality of permanent magnets 122 for magnetic field generation. The plurality of permanent magnets 122 are circumferentially spaced about the reference axis R. The plurality of permanent magnets 122 are arranged with alternating polarities so that rotation past the wire coils 106 of the stator 100 induces an alternating magnetic field. In the illustrated example, the permanent magnets 122 are arranged in a generally V-shaped repeating configuration. As illustrated, the rotor shaft 114 may have a splined end at the drive end 90 of the electric machine 52 for delivering or receiving rotational mechanical power.

In general, various parts and portions of the electric machine 52 may be sources of heat generation during use. Accordingly, the electric machine section 82 of the cooling circuit 80 distributes coolant throughout the stator 100 and rotor 102. The casing 70 of the electric machine 52 incorporates various structures for distributing coolant (e.g., liquid oil) about the electric machine 52 and out to the transmission assembly 54. The casing 70 has an intermediate flange 130 located between the drive end 90 and the non-drive end 92. The intermediate flange 130 includes a coolant inlet port 132 for supplying coolant to the cooling circuit 80 which, as noted above, is the only source of directed coolant for both the electric machine 52 and the transmission assembly 54. The casing 70 has a coolant outlet port 134 at the drive end 90 and formed in one of the mounting flanges 94. The coolant outlet port 134 is in fluid communication with the coolant inlet port 132. The coolant outlet port 134 fluidly couples the electric machine 52 to the mating transmission assembly 54 at a threshold 136 between the components, thereby allowing a shared coolant supply without separate plumbing lines, fittings, etc. It will be appreciated that in other examples or applications the coolant outlet port 134 may be provided at other locations about the casing 70. The casing 70 may be formed as one piece (e.g., integrally formed from the same material at the same time by the same process) including one or more of the mounting flanges 94 and the intermediate flange 130.

The casing 70 of the example electric machine 52 includes coolant passages 140 for providing a flow of coolant fluid throughout the electric machine 52, this flow being generally referred to as the electric machine section 82 of the cooling circuit 80, as noted above. The coolant passages 140 may be integrally formed as a unitary part of the casing 70. The end section 72 and the cap 74 of the electric machine housing 66 may also have coolant passages 140 formed therein. The coolant passages 140 include the coolant inlet port 132 for receiving a coolant input 144 and the coolant outlet port 134 for providing a coolant output 146 to the transmission assembly 54. The electric machine section 82 may be split into a stator feed circuit 148 and a rotor feed circuit 150 formed at least in part by the coolant passages 140. An inlet orifice 152 is positioned in the coolant inlet port 132 to meter coolant flow to the stator feed circuit 148, which in effect also meters flows to the rotor feed circuit 150 and out to the transmission assembly 54 via the coolant outlet port 134. In the illustrated example, an upper passage 154 of the coolant passages 140 extends from an intersection 156 leading toward the inlet orifice 152 to the coolant outlet port 134. It will be appreciated that the intersection 156 along with the intermediate flange 130 may be positioned at any axial location along the casing 70 between the drive end 90 and the non-drive end 92. Used coolant from the electric machine section 82 may passively flow to the drive end 90 to drain through the carrier 76, a drain conduit 157 or other location(s) along the casing 70 to be collected in the outlet block 86.

Figure 6:
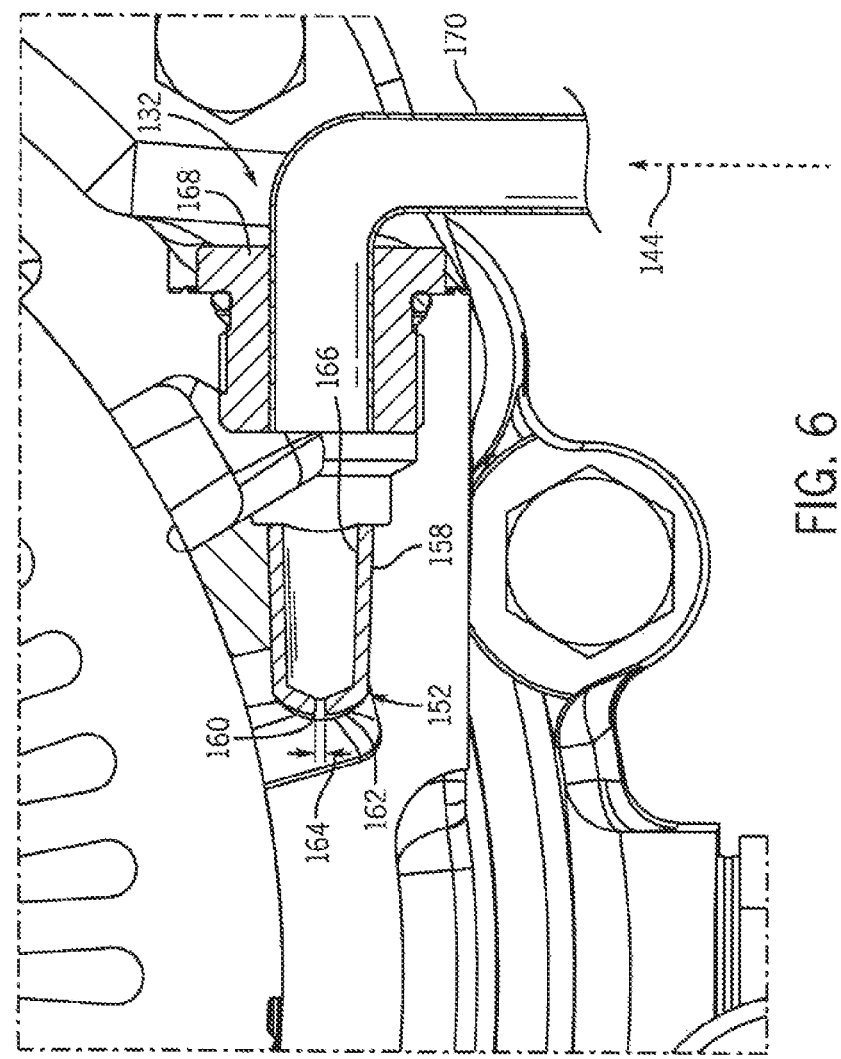
FIG. 6 is an enlarged detail view taken at area 6-6 of FIG. 4 and including a coolant feed line.

Referring also to FIG. 6, the inlet orifice 152 is mounted (e.g., press fit) in the coolant inlet port 132 at a lower region 158 thereof. The lower region 158 is a reduced diameter portion of the inlet port 132. The inlet orifice 152 may be formed of a metal or polymeric material providing a sealing friction fit with the lower region 158. The inlet orifice 152 has a metering port 160 formed in a floor 162 thereof. The metering port 160 is sized to provide a predetermined desired flow rate of coolant through the stator feed circuit 148 of the cooling circuit 80 (FIG. 3). As shown, the floor 162 of the inlet orifice 152 tapers in thickness toward the metering port 160 and the floor 162 is thicker than upright walls 166 of the inlet orifice 152, although other relative sizes and shapes may be implemented. In other examples, the inlet orifice 152 may be permanently mounted (e.g., adhered or welded) in the lower region 158 or the inlet orifice 152 may be integrally formed as a unitary part of the casing 70 and/or the intermediate flange 130 (e.g., formed from the same material at the same time by the same process).

The coolant input 144 for the electric machine 52 is provided at the coolant inlet port 132, as depicted in the example of FIG. 6. In this example, a coupler 168 connects a feed line 170 to the coolant inlet port 132. The coolant input 144 branches within the coolant inlet port 132 to flow through the coolant passages 140 to both the stator feed circuit 148 via the inlet orifice 152 and to both the rotor feed circuit 150 and the transmission section 84 via the intersection 156. The intersection 156 divides this flow of coolant to each of the stator feed circuit 148, the rotor feed circuit 150, and the upper passage 154 (leading through the threshold 136 to the transmission section 84 of the cooling circuit 80). In this manner, the coolant input 144 is single input providing active, controlled cooling to both the electric machine 52 and the transmission assembly 54. For the electric machine section 82, the metering port 160 of the inlet orifice 152 meters a flow rate into the stator feed circuit 148, and the balance of coolant passes into the rotor feed circuit 150. Because the coolant flow into the rotor feed circuit 150 and the transmission section 84 is a function of the coolant flow into the stator feed circuit 148, the inlet orifice 152 meters coolant flow to both the rotor feed circuit 150 and the stator feed circuit 148. In use, the inlet orifice 152 is readily installed (e.g., with manual tools) through the coolant inlet port 132. It will be appreciated that the feed line 170 is supplied coolant that is pumped from the tank 87, providing a closed loop for the cooling circuit 80.

The stator feed circuit 148 of the electric machine section 82 initially extends about a perimeter of the casing 70 with serpentine coolant passages 172 in multiple branches spaced axially. The serpentine coolant passages 172 are formed on an interior peripheral surface 174 of the casing 70. With this arrangement, coolant flow through the serpentine coolant passages 172 flows along in physical contact with an outer periphery of the core 104 of the stator 100 for direct convective cooling. In the illustrated example with three branches of the serpentine coolant passages 172, a substantial contact area is provided between coolant in the stator feed circuit 148 and the core 104 resulting in significant cooling. The serpentine coolant passages 172 may subsequently connect to one or more spray rings 176 (see FIG. 3) for cooling of the axial end turns 108 of the wire coils 106 of the stator 100.

Figure 9:
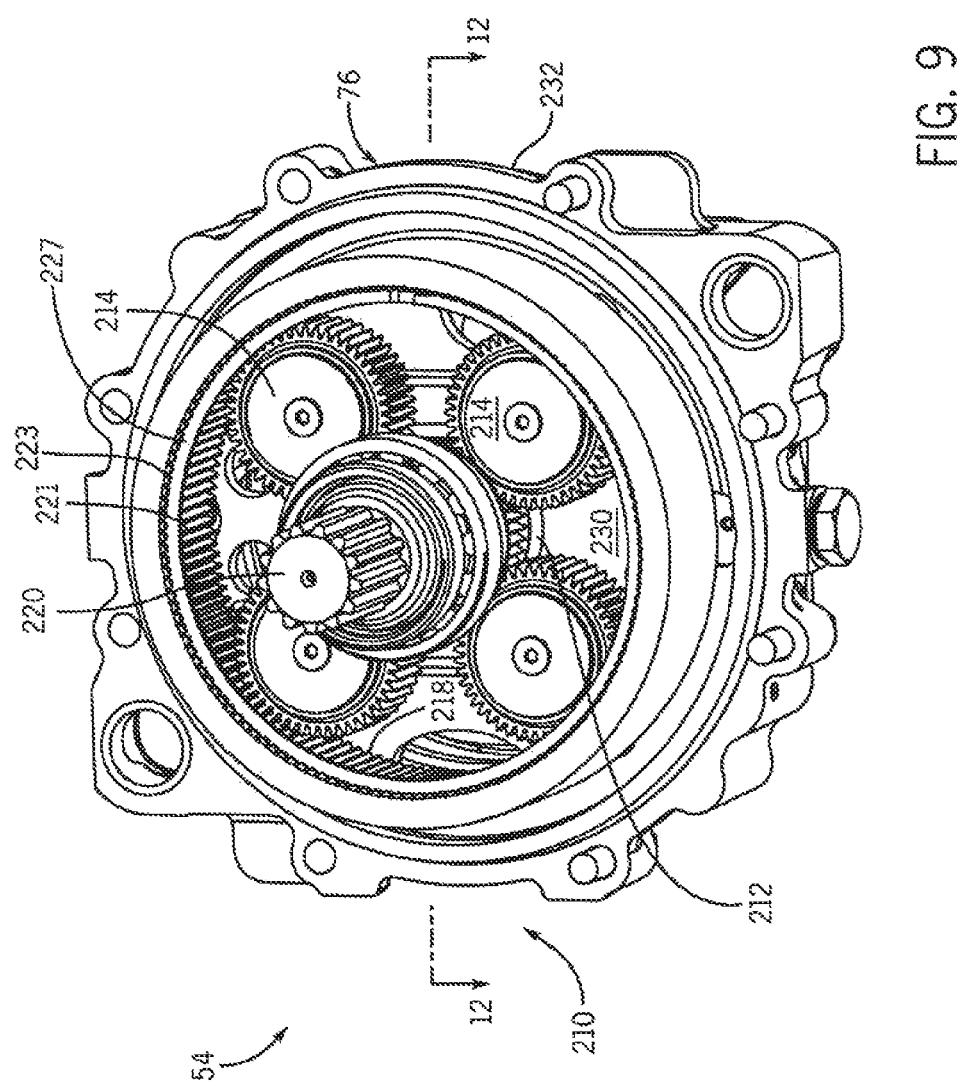
Figure 10:
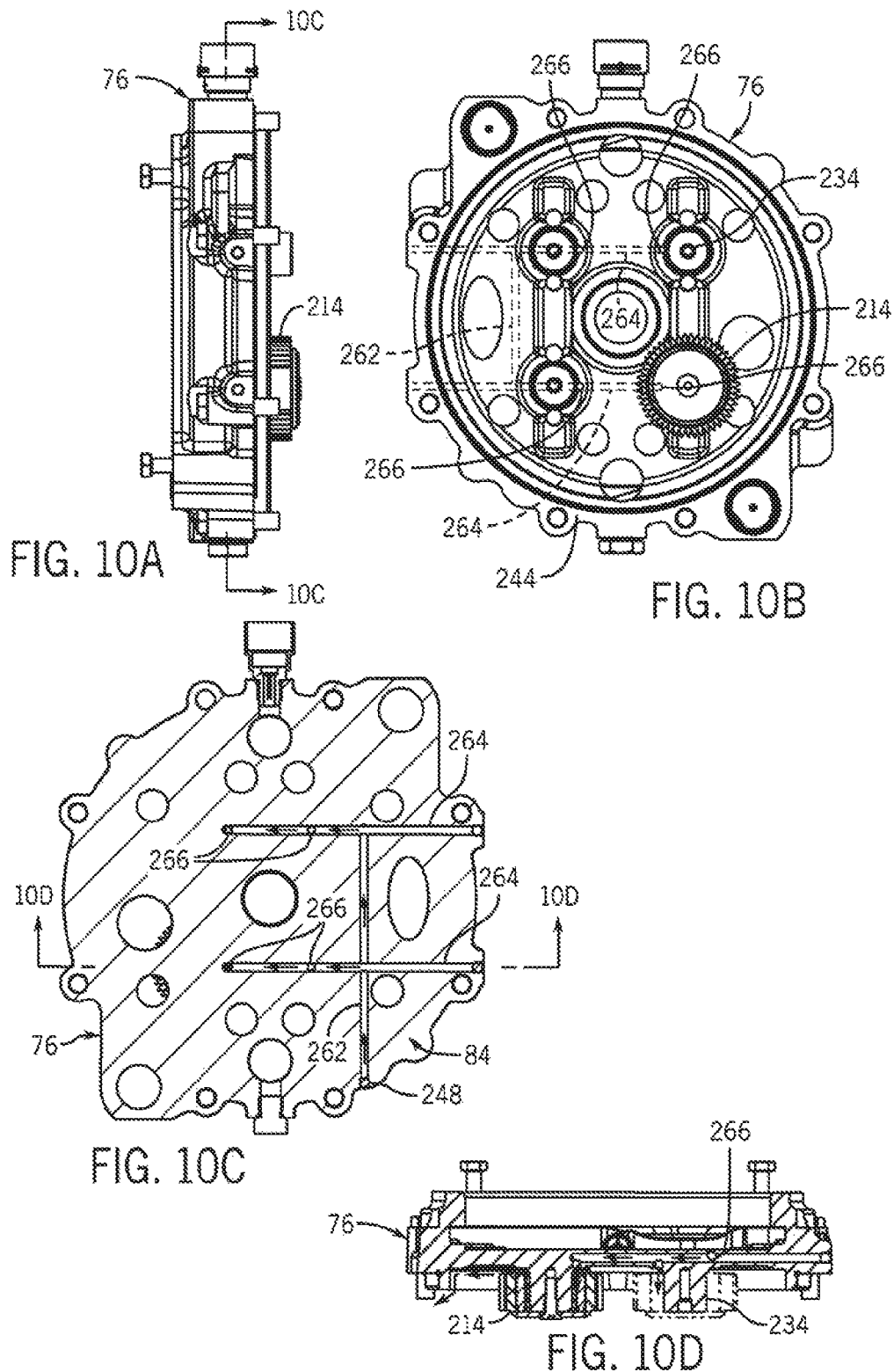
FIG. 10A is a side elevation view of the example transmission assembly of FIGS. 8 and 9 with certain components omitted.
FIG. 10B is a rear elevation view thereof with certain components omitted and certain features shown in broken lines.
FIG. 10C is a front cross-sectional view thereof taken at plane 10C-10C of FIG. 10A.
FIG. 10D is a cross-sectional view view thereof taken at plane 10D-10D of FIG. 10C with certain features shown in broken lines.

Referring now also to FIG. 9, the serpentine coolant passages 172 of the stator feed circuit 148 may subsequently connect to the one or more spray rings 176 (see FIG. 3) for additional cooling of the stator 100. The one or more spray rings 176 are mounted axially outside the core 104 of the stator 100 for directing a spray of coolant onto one or more corresponding axial end turns 108. The one or more spray rings 176 are calibrated to provide desired spray and cooling characteristics for cooling the stator 100, for example flow along an outer periphery of the axial end turns 108 and spread in a generally sheet-like manner. In some examples, the metering port 160 of the inlet orifice 152 may be sized to provide a flow rate that imparts a desired spray velocity from the spray rings 176.

For the stator feed circuit 148 in the illustrated example, coolant flows to the inlet orifice 152 from the coolant input 144 via the intersection 156. Coolant flows through the metering port 160 of the inlet orifice 152 into the serpentine coolant passages 172. As shown, coolant in the serpentine coolant passages 172 flows about a majority of a circumference of the interior peripheral surface 174 of the casing 70 in an axially central region of the casing, then the serpentine coolant passages 172 branch in both axial directions for coolant to flow about a majority of a circumference of the interior peripheral surface 174 proximate to the drive end 90 and the non-drive end 92 of the casing 70. Subsequently, coolant flows into the one or more spray rings 176 and to spray and contact the axial end turns 108 of the wire coils 106.

The rotor feed circuit 150 of the electric machine section 82, as illustrated in FIG. 3, initially extends axially away from the intersection 156 toward the non-drive end 92 of the electric machine 52. The rotor feed circuit 150 is arranged to transfer a portion of the coolant input 144 from the coolant inlet port 132 to and through the parts of the rotor 102. To accomplish this, the rotor feed circuit 150 has an outer axial passage 178 extending axially from the intersection 156 toward the non-drive end 92 of the electric machine 52. Subsequently at the non-drive end 92, an end radial passage 180 extends radially inward toward the rotor 102. An axial coolant passage 182 extends through the rotor shaft 114 and along the reference axis R. The axial coolant passage 182 may provide coolant as spline lube for the rotor shaft 114 at the drive end 90.

The rotor feed circuit 150 branches off from the axial coolant passage 182 to deliver coolant to the rotor core 118. In particular, one or more radial passages 184 intersect the axial coolant passage 182 and extend into the rotor core 118. Continuing from the one or more radial passages 184, the rotor core 118 includes axial coolant passages 186 to allow coolant to flow in both axial directions. The axial coolant passages 186 are circumferentially interspersed between each V-shape of the permanent magnets 122 to deliver coolant axially throughout the rotor core 118 and among the plurality of rotor laminations 120. The rotor feed circuit 150 may also provide coolant passages to the roller bearing assemblies 116 via one or more bearing radial passages 188.

For the rotor feed circuit 150 of the illustrated example, coolant flow from the coolant input 144 passes the intersection 156 into the outer axial passage 178. Coolant then flows radially inwardly through the end radial passage 180 to the axial coolant passage 182 of the rotor 102. In the axial coolant passage 182, coolant flows axially toward the drive end 90 while also branching off radially through the one or more radial passages 184 and the one or more bearing radial passages 188. From the one or more radial passages 184, the coolant flow branches in both axial directions through the axial coolant passage 186, passing through the rotor core 118 and out to drain. The coolant in the axial coolant passage 186 that does not branch off may continue through the rotor shaft 114.

Figure 8:
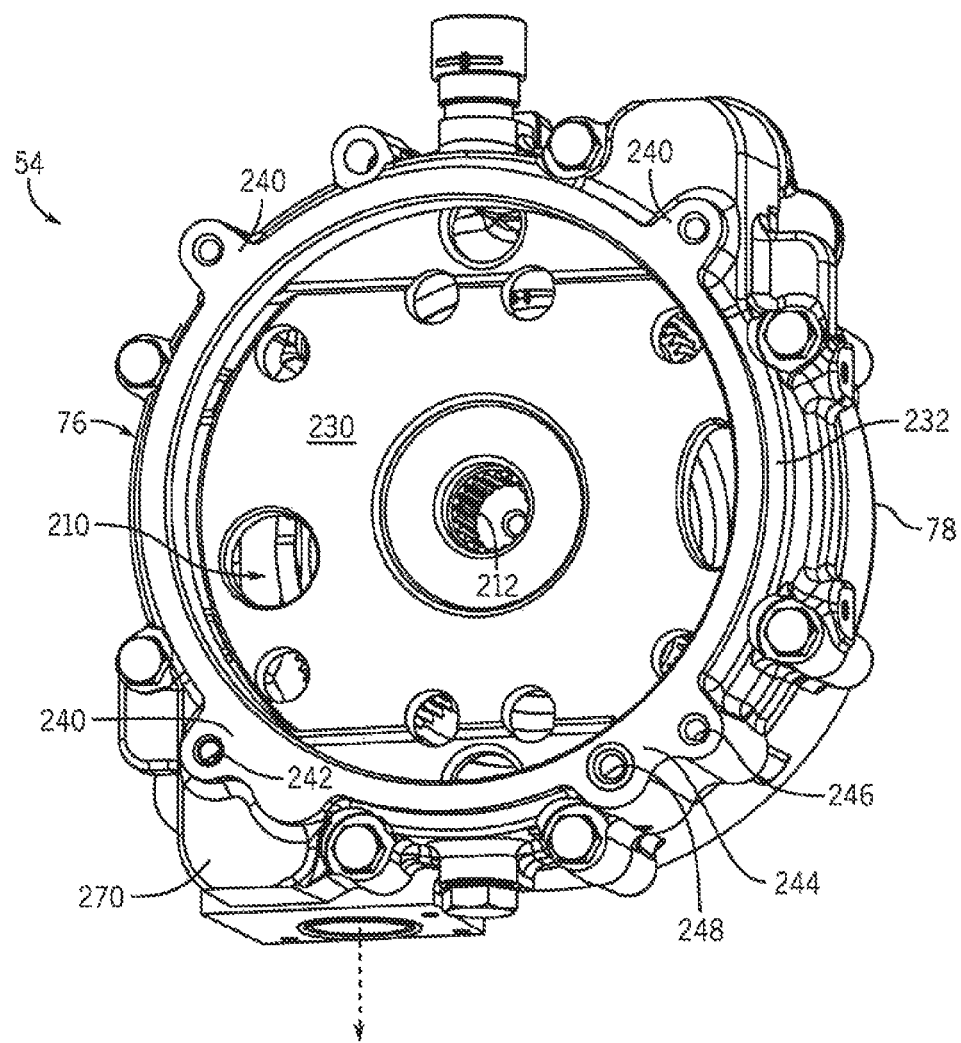
FIGS. 8 and 9 are front and rear isometric views of the example transmission assembly of the example drive assembly FIG. 2, shown with certain components omitted for clarity.
Figure 12:
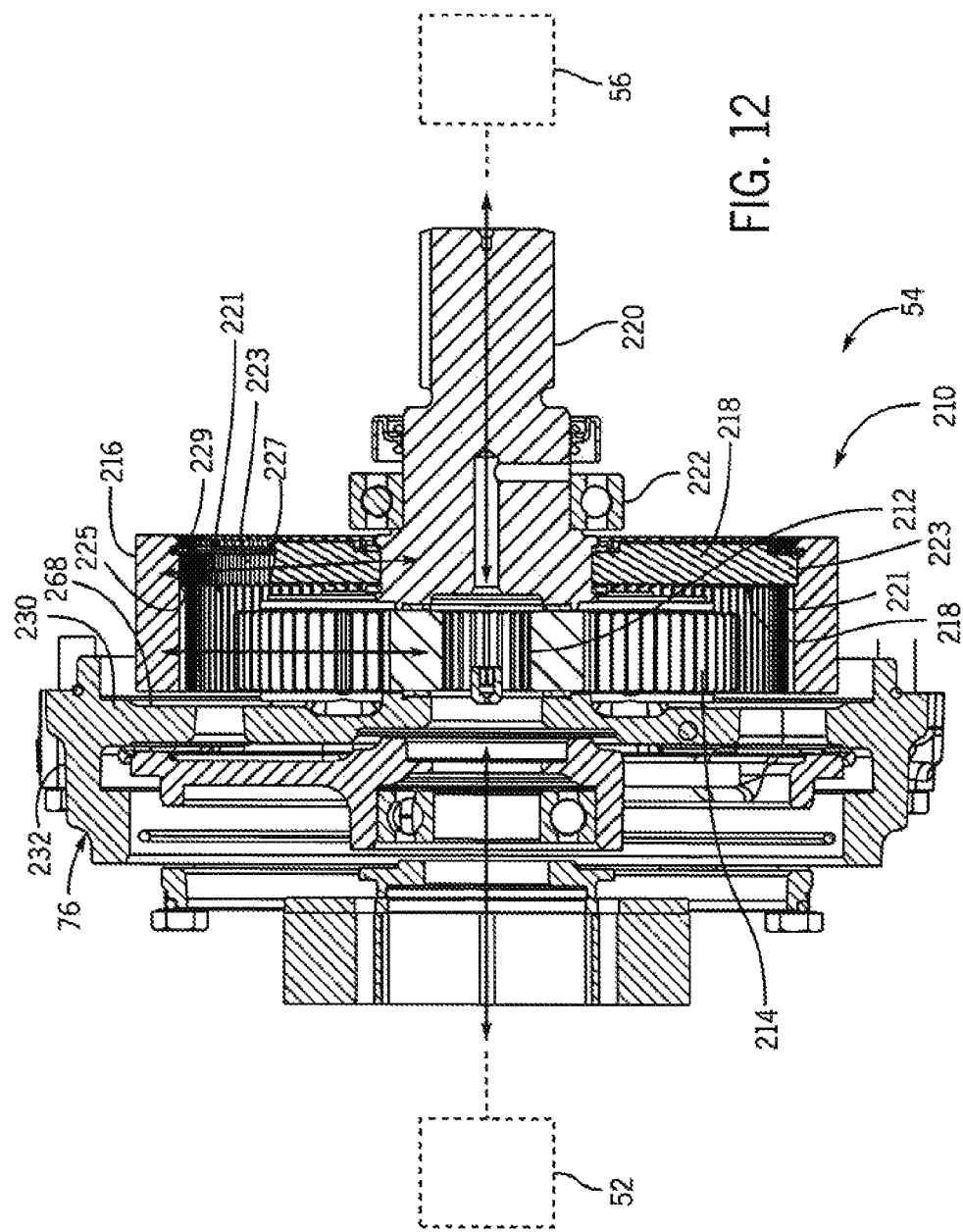
FIG. 12 is a cross-sectional view of the example transmission assembly taken at plane 12-12 of FIG. 9 with a plate gear shown partially cut away.

Referring also to FIGS. 8-9 and 12, the transmission assembly 54 is shown in detail including the transmission housing 68 containing, at least in part, a gear set 210. In the illustrated example, the gear set 210 is an epicyclic gear set including a sun gear 212, one or more planet gears 214, a ring gear 216, and the carrier 76. The carrier 76 is non-rotational (e.g., fixed relative to the drive assembly housing 64) and mounts the one or more planet gears 214 for rotation about the reference rotational axis R. The rotational axis R of the sun gear 212 in the illustrated example is the same rotational axis R as the rotor shaft 114 of the electric machine 52. The ring gear 216 includes a plate gear 218 that is an annular disk extending from toothed or splined outer diameter meshed with the ring gear 216 to a toothed or splined inner diameter meshed with an output shaft 220 of the transmission assembly. The ring gear 216 in the illustrated example has two toothed regions 221 and 223 of different tooth count and/or configuration, with the teeth 221 of the ring gear configured to mesh with teeth of the planet gears 214 and the teeth 223 configured to mesh with the teeth at the outer diameter of the plate gear 218. The different count/configurations of the teeth 221 and 223 allow the ring gear 216 to interface at different gear ratios with the planet gears 214 and the plate gear 218. In some cases, however, the ring gear 216 may have a single toothed or splined section through its inner diameter that meshes with the planet gears 214 and the plate gear 218 with a common ratio. The plate gear 218 is held captive between a shoulder 225 of the ring gear 216 and a retaining ring 227 that fits in an annular groove 229 at the inner diameter of the ring gear 216 within the toothed region 223. The output shaft 220 is supported for rotation relative to the transmission housing 68 by one or more bearings, for example roller bearing assembly 222.

FIG. 12 illustrates two power flows provided by the drive assembly 50 reflecting a drive mode and a generator mode. The gearing arrangement and connections of the transmission assembly 54 remain the same in both modes, including the carrier 76 being fixed (i.e., grounded) against rotation. The drive mode power flow begins at the electric machine 52, which functions as a motor outputting mechanical power. The electric machine 52 may be energized due to a preceding power generation mode, or selectively energized via another source such as the battery 46. When energized, electrical current in the wire coils 106 of the stator 100 induces rotation of the permanent magnets 122 of the rotor 102 and therefore also rotation of the rotor shaft 114. The rotor shaft 114 interfaces with the sun gear 212 of the epicyclic gear set 210 in the transmission assembly 54, thereby driving the planet gears 214 to rotate. Because the carrier 76 is fixed, the planet gears 214 are unable to revolve within the ring gear 216, and therefore rotation of the planet gears 214 drives rotation of the ring gear 216. The ring gear 216 rotates with the plate gear 218 and the output shaft 220, outputting mechanical power (e.g., rotation) to the pump drive 56 for transfer to another component of the work vehicle 20. Accordingly, in the drive mode, the gear set 210 of the transmission assembly 54 provides a sun-in, ring-out configuration with the electric machine 52 converting electrical energy to mechanical energy.

In the generator mode, the engine 40 begins the power flow from an external source in the pump drive 56 (e.g., a gear set in the pump drive 56 driven by the engine shaft 42), which provides mechanical power to the drive assembly 50. Rotation from the pump drive 56 is transferred to the output shaft 220, which rotates with and drives the plate gear 218 and the ring gear 216, which in turn drives rotation of the planet gears 214. The carrier 76 remains fixed and thus the planet gears 214 drive rotation of the sun gear 212. The sun gear 212 interfaces with the rotor shaft 114 of the electric machine 52, and the resulting rotation of the permanent magnets 122 in the rotor 102 induces a current in the wire coils 106 of the stator 100. Accordingly, in the generator mode, the gear set 210 of the transmission assembly 54 provides a ring-in, sun-out configuration with the electric machine 52 converting mechanical energy to electrical energy.

It is noted that the output shaft 220 of the transmission assembly 54 may connect to various subsystems or components of the work vehicle 20, such as a gear assembly (not shown) of the pump drive 56 that couples to a hydraulic component (e.g., one or more hydraulic pumps (not shown) connected to the pump drive 56 at the mounts 58). In other implementations, the output shaft 220 may connect to other components, such as a damper, a mechanical connection to the engine shaft 42, or other auxiliary components of the work vehicle 20. It is also noted that other types of gear sets are applicable to the present disclosure for providing similar gear reduction between the electric machine 52 and the connected subsystem/component. Such other gear sets may define different rotational axes that are not coaxial with the rotational axis R of the rotor shaft 114 (e.g., a parallel axis or a perpendicular axis).

In the illustrated embodiment, the carrier 76 of the gear set 210 not only works to set the gear ratio of the transmission assembly 54 but it also serves as a portion of a transmission housing 68 and as a part of the transmission section 84 of the cooling circuit 80. Specifically, the carrier 76 is has an annular disk 230 section extending radially and an annular peripheral wall 232 extending axially, both of which extend about the axial reference axis R (e.g., a drive axis). The annular disk 230 includes pinion shafts or spindles 234 extending axially from the annular disk to mount the planet gears 214. As a portion of the transmission housing 68, the carrier 76 joins with the gearbox 78 to form the transmission housing 68 encasing the gear set 210 as a discrete component of the drive assembly 50. The carrier 76 interfaces with the electric machine 52 to fixedly mount the transmission assembly 54 to the electric machine 52 (e.g., via bolts 96). A plurality of mounting flanges 240 extend from the peripheral wall 232 of the carrier 76, each mounting flange 240 having a mounting hole 242 for receiving fasteners such as the bolts 96 that fasten to the electric machine 52. A dual flange 244 of the carrier 76 similarly extends from the peripheral wall 232 and includes both a mounting hole 246 and an interface coolant passage 248. The mounting holes 242 and 246 of the transmission assembly 54 are evenly spaced about the perimeter of the carrier 76. Due to a symmetrical arrangement of the mounting holes 246 in the carrier 76, the transmission assembly 54 may be mounted at different orientations as required for coupling with the electric machine 52.

Figure 7:
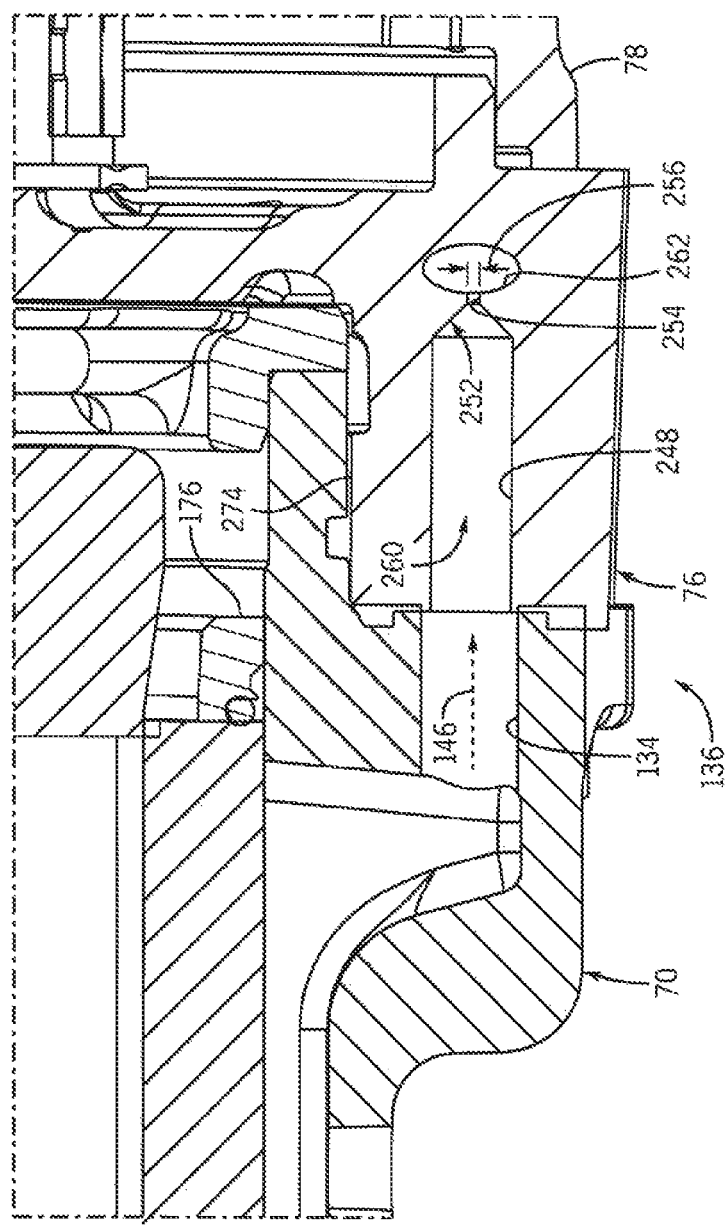
FIG. 7 is an enlarged detail view taken at area 7-7 of FIG. 3.

The interface coolant passage 248 is formed in an end face 250 of the carrier 76 and extends axially to a control orifice 252 for metering the flow of coolant into the transmission section 84. The control orifice 252 provides the only controlled coolant flow to the transmission assembly 54 through a metering port 254 having a diameter 256 that is configured to provide a desired flow rate into the transmission section 84 of the cooling circuit 80. As shown in FIGS. 3 and 7, the interface coolant passage 248 is aligned and in fluid communication with the coolant outlet port 134 of the electric machine 52 to form the threshold 136 between the respective components and cooling portions. Accordingly, the interface coolant passage 248 provides a flow of coolant (i.e., the coolant output 146) to the transmission assembly 54 received from the electric machine section 82 of the cooling circuit 80 for the drive assembly 50. The control orifice 252 may be formed as a unitary part of the carrier 76, for example by machining, although in other examples the control orifice 252 may be a separate part, for example, a metal or polymeric part press-fit in the interface coolant passage 248 in the same manner as the inlet orifice 152 discussed above. It should be noted that the term "orifice" as used herein denotes a physical structure, which also may be known as a "restriction plate" in removable applications, and the term does not connote a generic opening in a structure. In particular, an orifice is a structure that includes a dimensioned opening, such as the disclosed examples of the metering port 160 of the inlet orifice 152 or the metering port 254 of the control orifice 252, or a similar opening (or narrowed area) that produces desired flow characteristics.

FIGS. 10A-10D and 11 detail the flows of coolant through the transmission assembly 54. The carrier 76 of the transmission assembly 54 includes a plurality of carrier coolant passages 260 for providing a flow of coolant fluid through and about the gear set 210, generally referred to as the transmission section 84 of the cooling circuit 80, as noted above. The carrier coolant passages 260 are formed within the material of the carrier 76, for example by drilling and/or machining. The carrier coolant passages 260 begin with the interface coolant passage 248 extending axially from the threshold 136 to the control orifice 252 and receiving the coolant output 146 the electric machine 52. From the control orifice 252, the coolant passages 260 of the carrier 76 turn radially inward and include one or more longitudinal passages 262 and one or more lateral passages 264 extending about the area of the carrier 76. Planet passages 266 extend axially along the spindle 234 for each of the one or more planet gears 214. Coolant exits the planet passages 266 to an internal area of the planet gears 214 to lubricate and flow through bearings (e.g., needle roller bearings not shown) that support the planet gears 214. Subsequently, the coolant flows radially outward (e.g., downward due to gravity) from the planet gears 214 to the ring gear 216 and through a gap 268 (see FIG. 11) between the ring gear 216 and the annular disk 230 of the carrier 76 to collect in the gearbox 78. In this manner, during use, coolant is spread throughout the gear set 210 to provide broad coverage for cooling and lubrication.

Figure 11:
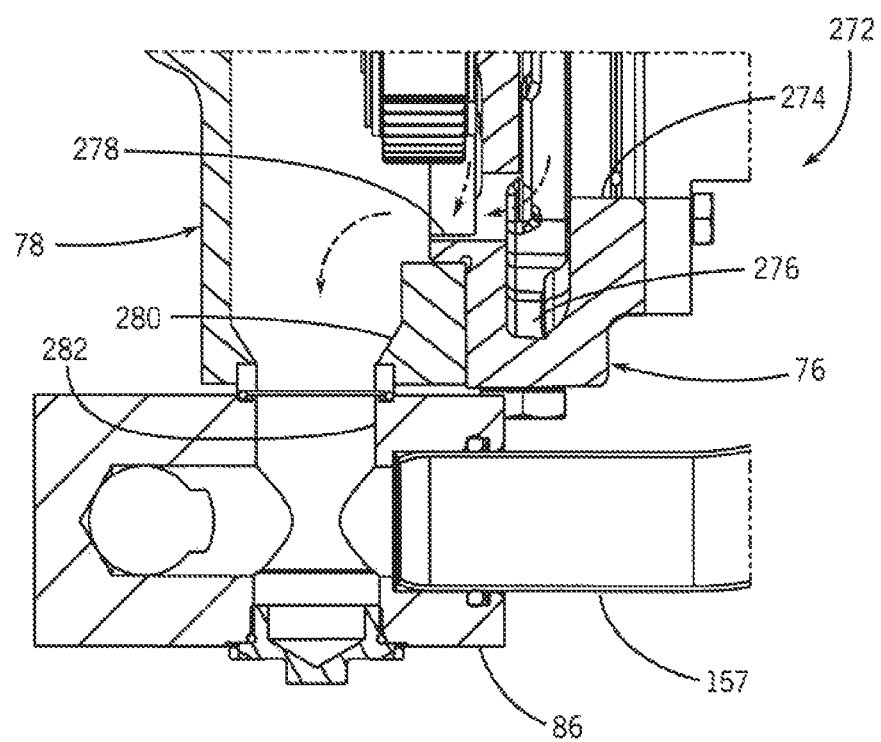
FIG. 11 is a partial cross-sectional view of the example drive assembly taken at plane 11-11 of FIG. 2 showing a drain area and outlet from the transmission assembly.

The gearbox 78 includes a collection area 270 for used oil to passively collect and flow to the outlet block 86. As shown in FIG. 11, the cooling circuit 80 provides a combined drain circuit 272 for joining return coolant from both the electric machine section 82 and the transmission section 84. As noted above, the non-drive end 92 of the electric machine 52 passively drains to a drain conduit 157 that leads to the outlet block 86. The drive end 90 of the electric machine mounts within, at least in part, a ledge 274 extending from the carrier 76. The transmission housing 68 provides a series of recesses and passages for passively directing used coolant toward the outlet block 86. A channel 276 is formed in the carrier 76 axially beyond the ledge 274, and an axial opening 278 in the annular disk 230 fluidly communicates with the interior of the transmission housing 68. At this juncture, draining coolant from the transmission section 84 joins the coolant draining from the drive end 90 of the electric machine and the combined drain flows collect in a depression 280 that connects to a drain passage 282 leading into the outlet block 86. From there, coolant can be returned to the tank 87, cooled actively or passively before again being pumped to the coolant inlet port 132 via the feed line 170 (FIG. 4).

The control orifice 252 of the carrier 76 defines the metering port 254 to meter coolant flow to the transmission section 84. The metering port 254 of the control orifice 252 may be sized to provide a flow rate that is sufficient to maintain a desired operating temperature in the transmission assembly 54. In some examples, the control orifice 252 may provide a flow rate of about 0.5-3 L/min with a diameter 256 of about 1-3 mm, and in one example may provide a flow rate of about 1.5-2 L/min with the diameter 256 of the metering port 254 at about 1.4-1.6 mm. The electric machine 52 will also have a required flow rate of coolant that is sufficient to maintain a desired operating temperature therein. The cooling of both components (electric machine 52 and transmission assembly 54) is therefore achieved as long as the flow rate to the cooling circuit 80 is at least a sum of the required flow rates for the electric machine 52 and the transmission assembly 54. Therefore, a coolant input 144 providing a flow rate of 10.5-15 L/min will provide adequate cooling should the electric machine 52 require a coolant flow of 10-12 L/min through the electric machine section 82 and the transmission assembly require a coolant flow of 0.5-3 L/min through the transmission section 84.

The transmission assembly 54 may also be configured to be mounted with a range of electric machine sizes (e.g., motors sized by power ratings in kilowatts or horsepower), allowing for simplified manufacture of the drive assembly 50. The electric machine 52 is considered to have a first power capacity that requires a first coolant flow rate for proper cooling, and can be substituted by various other electric machines, for example a second electric machine (e.g., 52A shown schematically in FIG. 1) having a second power capacity requiring a second coolant flow rate or a third electric machine (e.g., 52B shown schematically in FIG. 1) having a third power capacity requiring a third coolant flow rate. With any of such three electric machines implemented, the control orifice 252 of the carrier 76 is configured to provide the required coolant flow rate for the transmission assembly 54. The first, second, and third electric machines (52, 52A, 52B) may be considered related models or product lines with a range of power capacities in similar overall form factors. In certain examples, the control orifice 252 may be configured to balance coolant flow to the transmission assembly 54 while mounted with a selected electric machine 52, 52A, 52B from a group of models with sizes including, for example, from 100 kW, 120 kW, 140 kW, 160 kW, 180 kW, or 200 kW. Corresponding required flow rates of coolant may range, for example, from 5-25 L/min. Therefore, in a broad sense, if the electric machine 52, 52A, 52B is selected from this group of electric machines requiring a coolant flow of 5-25 L/min through the electric machine section 82 and the transmission assembly requires 0.5-3 L/min through the transmission section 84, then the coolant input 144 would require a flow rate of 5.5-28 L/min. In other examples, the related electric machines may each be a motor in a power range from 3-50 kW, 25-100 kW, 100-200 kW, 50-300 kW, or other similar ranges and sub-ranges.

The foregoing describes one or more example drive assemblies in detail. Various other configurations are possible within the scope of this disclosure, including incorporating additional components in the combined cooling circuit, such as supplemental electric machine serving as a generator and implementing the control orifice in a different part of the transmission assembly that is separate from the carrier. The gear set may be provided as a multi-stage gear set with multiple gear ratios selectable by a clutch. Moreover, the drive assembly may be implemented for a variety of applications within a given work vehicle separate from the example pump drive. The drive assembly may also be implemented in other vehicles, other work vehicles, or other industrial applications. Onboard a work vehicle, the drive assembly may have various locations and applications including separate from the pump drive, including a drive assembly powering a wheel axle. The drive assembly may also supplement hydraulic systems and components such as steering components, hydraulic front-end loaders, or other work implements.

Enumerated Examples of Drive Assembly

Also, the following examples are provided, which are numbered for easier reference.

1. An drive assembly for a work vehicle including: a transmission assembly having a gear set at least in part contained within a transmission housing and having a control orifice communicating with a transmission section of a cooling circuit for the drive assembly, the transmission section of the cooling circuit being at least in part within the transmission housing; and an electric machine having a casing coupled to the transmission housing to be mounted fixedly thereto, the casing having a coolant inlet port and defining an electric machine section of the cooling circuit for the drive assembly that is at least in part within the casing; wherein a controlled flow of coolant is transferred from the electric machine section of the cooling circuit to the transmission section of the cooling circuit via the control orifice.

2. The drive assembly of example 1, the control orifice having a metering port configured to meter the transfer of coolant to the transmission assembly.

3. The drive assembly of example 1, wherein the controlled flow of coolant is transferred between the transmission section of the cooling circuit and the electric machine section of the cooling circuit only via the control orifice.

4. The drive assembly of example 3, wherein the electric machine is selected from one of a first power capacity requiring a first coolant flow rate, a second power capacity requiring a second coolant flow rate, and a third power capacity requiring a third coolant flow rate; and wherein the control orifice is configured to provide each of the first coolant flow rate, the second coolant flow rate, and the third coolant flow rate.

5. The drive assembly of example 1, wherein the transmission assembly includes a gear component having the control orifice; and wherein the gear component forms an interface housing coupling the transmission housing and the casing.

6. The drive assembly of example 5, wherein the control orifice is a machined part integrally formed in the gear component.

7. The drive assembly of example 5, wherein the gear set of the transmission assembly is an epicyclic gear set having a sun gear, one or more planet gears, and a ring gear; and wherein the gear component is a carrier mounting the one or more planet gears of the epicyclic gear set.

8. The drive assembly of example 1, further comprising an engine having an engine shaft; and wherein the gear set of the transmission assembly is an epicyclic gear set having a sun gear, one or more planet gears, and a ring gear interfacing with the engine shaft.

9. The drive assembly of example 8, the drive assembly configured to effect a drive mode in which power flows in a first power flow direction from the electric machine to the transmission assembly and configured to effect a generator mode in which power flows in a second power flow direction from the engine shaft to the transmission assembly to the electric machine.

10. The drive assembly of example 9, wherein, in the drive mode, the electric machine powers rotation of a rotor shaft of the electric machine, to the sun gear, to the one or more planet gears, and to the ring gear out to provide mechanical power to another component of the work vehicle; and wherein, in the generation mode, the engine powers rotation of the engine shaft, to the ring gear, to the one or more planet gears, and to the sun gear out to the rotor shaft of the electric machine to generate electrical power.

11. The drive assembly of example 1, wherein the electric machine section of the cooling circuit has a coolant outlet port at an axial end of the casing, the coolant outlet port in fluid communication with the control orifice to transfer the flow of coolant from the electric machine section to the transmission section of the cooling circuit.

12. The drive assembly of example 1, wherein the casing of the electric machine includes an inlet orifice in the cooling circuit proximate the coolant inlet port, the inlet orifice having a metering port configured to meter a flow of coolant to the electric machine section of the cooling circuit.

13. The drive assembly of example 1, wherein the electric machine includes a stator and a rotor contained at least in part within the casing, the rotor having a rotor shaft rotatable about a drive axis relative to the stator and interfacing with the gear set of the transmission assembly; and wherein the electric machine section of the cooling circuit includes a rotor feed circuit and a stator feed circuit.

14. The drive assembly of example 13, wherein the casing of the electric machine includes: an inlet orifice in the cooling circuit proximate the coolant inlet port, the inlet orifice configured to meter a flow of coolant to the stator feed circuit, and an annular body with an interior peripheral surface in contact with an outer periphery of the stator; and wherein the stator feed circuit defines one or more serpentine coolant passages that, at least in part, are recessed in the interior peripheral surface and in which the coolant is routed across the outer periphery of the stator.

15. In further embodiments, a work vehicle having an engine and an engine shaft is provided that includes a drive assembly, including: a drive assembly housing for mounting the drive assembly and retaining a volume of coolant within the drive assembly, the drive assembly housing including a transmission housing and a casing coupled to the transmission housing to be mounted fixedly thereto; a transmission assembly having a gear set at least in part contained within the transmission housing and having a control orifice communicating with a transmission section of a cooling circuit for the drive assembly, the transmission section of the cooling circuit being at least in part within the transmission housing; and an electric machine at least in part contained within the casing, the casing having a coolant inlet port and defining an electric machine section of the cooling circuit for the drive assembly that is at least in part within the casing; wherein a controlled flow of coolant is transferred from the electric machine section of the cooling circuit to the transmission section of the cooling circuit via the control orifice.

Conclusion

The examples discussed above result in a variety of benefits of the disclosed drive assembly. For example, the drive assembly allows for a single coolant source with improved cooling features throughout both the electric machine and the transmission as well as other components downstream from the electric machine (e.g., a generator). The direct coolant flow transmission between the housings of discrete components (electric machine and the transmission assembly) provides an improved and efficient cooling system requiring less coolant and a compact form factor. The flow of coolant is controlled through one or more orifices to provide the requisite flow volume to each component in series within a single pass through the cooling circuit (i.e., before returning to tank). The drive assembly also provides ready configurability for a range of electric machines or various mated components in the work vehicle.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications and variations on the described example(s). Accordingly, various embodiments and implementations other than those explicitly described are within the scope of the following claims.

What is claimed is:

1. A drive assembly for a work vehicle comprising:
a transmission assembly having a gear set at least in part contained within a transmission housing and having a control orifice communicating with a transmission section of a cooling circuit for the drive assembly, the transmission section of the cooling circuit being at least in part within the transmission housing; and
an electric machine having a casing coupled to the transmission housing to be mounted fixedly thereto, the casing having a coolant inlet port and defining an electric machine section of the cooling circuit for the drive assembly that is at least in part within the casing;

wherein a controlled flow of coolant is transferred from the electric machine section of the cooling circuit to the transmission section of the cooling circuit via the control orifice; and wherein the controlled flow of coolant is transferred between the transmission section of the cooling circuit and the electric machine section of the cooling circuit only via the control orifice.

2. The drive assembly of claim 1, the control orifice having a metering port configured to meter the transfer of coolant to the transmission assembly.

3. The drive assembly of claim 1, wherein the electric machine is selected from one of a first power capacity requiring a first coolant flow rate, a second power capacity requiring a second coolant flow rate, and a third power capacity requiring a third coolant flow rate; and wherein the control orifice is configured to provide each of the first coolant flow rate, the second coolant flow rate, and the third coolant flow rate.

4. The drive assembly of claim 1, wherein the transmission assembly includes a gear component having the control orifice; and wherein the gear component forms an interface housing coupling the transmission housing and the casing.

5. The drive assembly of claim 4, wherein the control orifice is a machined part integrally formed in the gear component.

6. The drive assembly of claim 4, wherein the gear set of the transmission assembly is an epicyclic gear set having a sun gear, one or more planet gears, and a ring gear; and wherein the gear component is a carrier mounting the one or more planet gears of the epicyclic gear set.

7. The drive assembly of claim 1, further comprising an engine having an engine shaft; and wherein the gear set of the transmission assembly is an epicyclic gear set having a sun gear, one or more planet gears, and a ring gear interfacing with the engine shaft.

8. The drive assembly of claim 7, the drive assembly configured to effect a drive mode in which power flows in a first power flow direction from the electric machine to the transmission assembly and configured to effect a generator mode in which power flows in a second power flow direction from the engine shaft to the transmission assembly to the electric machine.

9. The drive assembly of claim 8, wherein, in the drive mode, the electric machine powers rotation of a rotor shaft of the electric machine, to the sun gear, to the one or more planet gears, and to the ring gear out to provide mechanical power to another component of the work vehicle; and wherein, in the generation mode, the engine powers rotation of the engine shaft, to the ring gear, to the one or more planet gears, and to the sun gear out to the rotor shaft of the electric machine to generate electrical power.

10. The drive assembly of claim 1, wherein the electric machine section of the cooling circuit has a coolant outlet port at an axial end of the casing, the coolant outlet port in fluid communication with the control orifice to transfer the flow of coolant from the electric machine section to the transmission section of the cooling circuit.

11. A drive assembly for a work vehicle comprising:
a transmission assembly having a gear set at least in part contained within a transmission housing and having a control orifice communicating with a transmission section of a cooling circuit for the drive assembly, the transmission section of the cooling circuit being at least in part within the transmission housing; and an electric machine having a casing coupled to the transmission housing to be mounted fixedly thereto, the casing having a coolant inlet port and defining an electric machine section of the cooling circuit for the drive assembly that is at least in part within the casing;

wherein a controlled flow of coolant is transferred from the electric machine section of the cooling circuit to the transmission section of the cooling circuit via the control orifice; and wherein the casing of the electric machine includes an inlet orifice in the cooling circuit proximate the coolant inlet port, the inlet orifice having a metering port configured to meter a flow of coolant to the electric machine section of the cooling circuit.

12. The drive assembly of claim 1, wherein the electric machine includes a stator and a rotor contained at least in part within the casing, the rotor having a rotor shaft rotatable about a drive axis relative to the stator and interfacing with the gear set of the transmission assembly; and wherein the electric machine section of the cooling circuit includes a rotor feed circuit and a stator feed circuit.

13. The drive assembly of claim 12,
wherein the casing of the electric machine includes:
an inlet orifice in the cooling circuit proximate the coolant inlet port, the inlet orifice configured to meter a flow of coolant to the stator feed circuit, and
an annular body with an interior peripheral surface in contact with an outer periphery of the stator; and
wherein the stator feed circuit defines one or more serpentine coolant passages that, at least in part, are recessed in the interior peripheral surface and in which the coolant is routed across the outer periphery of the stator.

14. A work vehicle having an engine and an engine shaft, the work vehicle comprising:
a drive assembly, including:
a drive assembly housing for mounting the drive assembly and retaining a volume of coolant within the drive assembly, the drive assembly housing including a transmission housing and a casing coupled to the transmission housing to be mounted fixedly thereto;
a transmission assembly having a gear set at least in part contained within the transmission housing and having a control orifice communicating with a transmission section of a cooling circuit for the drive assembly, the transmission section of the cooling circuit being at least in part within the transmission housing; and
an electric machine at least in part contained within the casing, the casing having a coolant inlet port and defining an electric machine section of the cooling circuit for the drive assembly that is at least in part within the casing;
wherein a controlled flow of coolant is transferred from the electric machine section of the cooling circuit to the transmission section of the cooling circuit via the control orifice; and
wherein the casing of the electric machine includes an inlet orifice in the cooling circuit proximate the coolant inlet port, the inlet orifice having a metering port configured to meter a flow of coolant to the electric machine section of the cooling circuit.

15. The work vehicle of claim 14, wherein the transmission assembly includes a gear component having the control orifice; and wherein the gear component forms an interface housing coupling the transmission housing and the casing.

16. The work vehicle of claim 15, wherein the gear set of the transmission assembly is an epicyclic gear set having a sun gear, one or more planet gears, and a ring gear; and
wherein the gear component is a carrier mounting the one or more planet gears of the epicyclic gear set.

17. The work vehicle of claim 16, the drive assembly configured to effect a drive mode in which power flows in a first power flow direction from the electric machine to the transmission assembly and configured to effect a generator mode in which power flows in a second power flow direction from the engine shaft to the transmission assembly to the electric machine;
wherein, in the drive mode, the electric machine powers rotation of a rotor shaft of the electric machine, to the sun gear, to the one or more planet gears, and to the ring gear out to provide mechanical power to another component of the work vehicle; and
wherein, in the generation mode, the engine powers rotation of the engine shaft, to the ring gear, to the one or more planet gears, and to the sun gear out to the rotor shaft of the electric machine to generate electrical power.

18. The work vehicle of claim 14, wherein the electric machine includes a stator and a rotor contained at least in part within the casing, the rotor having a rotor shaft rotatable about a drive axis relative to the stator and interfacing with the gear set of the transmission assembly;
wherein the electric machine section of the cooling circuit includes a rotor feed circuit and a stator feed circuit, the stator feed circuit defining one or more serpentine coolant passages that, at least in part, are recessed in the interior peripheral surface and in which the coolant is routed across the outer periphery of the stator; and
wherein the casing of the electric machine includes an annular body with an interior peripheral surface in contact with an outer periphery of the stator.

19. The work vehicle of claim 14, the electric machine section of the cooling circuit having a coolant outlet port at an axial end of the casing, the coolant outlet port in fluid communication with the control orifice to transfer the flow of coolant from the electric machine section to the transmission section of the cooling circuit.

* * * * *